Aug. 14, 1956 L. L. BURNS, JR 2,759,102

MECHANICALLY STABILIZED OSCILLATORS

Filed Sept. 23, 1952

INVENTOR.
Leslie L. Burns, Jr.

BY Charles H. Brown
ATTORNEY

United States Patent Office 2,759,102

Patented Aug. 14, 1956

2,759,102

MECHANICALLY STABILIZED OSCILLATORS

Leslie L. Burns, Jr., Princeton, N. J., assignor to Radio Corporation of America, a corporation of Delaware Application September 23, 1952, Serial No. 311,055

8 Claims. (Cl. 250—36)

This invention relates to mechanically stabilized oscillators, and more particularly, to cathode coupled oscillators wherein the frequency of oscillation is determined by a mechanical resonator.

Oscillators including frequency determining mechanical resonators are normally constructed so that the resonator provides a coupling between the grid and anode circuits of a vacuum tube. Cathode coupled oscillators employing two triodes, without a mechanical resonator, are known in the art. However, so far as applicant is aware, no one has constructed a cathode coupled oscillator including two electron control levices and a mechanical resonator operatively coupled between the cathodes or emitters of the two devices.

It is an object of this invention to provide an improved oscillator wherein the frequency of oscillation is determined by the physical parameters of a mechanical resonator.

It is another object of this invention to provide a novel oscillator which readily may be adjusted to oscillate at any one of a number of harmonically related frequencies.

It is a further object to provide an oscillator wherein the frequencies of oscillation readily may be changed by the substitution of one magnetostrictive resonator for another.

It is a still further object to provide a frequency stabilized oscillator wherein the frequency is determined with great accuracy by means of a relatively small and inexpensive magnetostrictive resonator element.

In one aspect, the invention teaches the use of a pair of electron control devices, which may be vacuum tubes or transistors, and a mechanical resonator element coupled between the cathodes or emitters of the electron control devices. Various harmonically related frequencies of oscillation can be obtained with a single mechanical resonator by adjusting the positions of the coupling means along the mechanical resonator. Different harmonically related frequencies may be generated by simply substituting one mechanical resonator for another, the dimensions of the mechanical resonator being determinative of the harmonically related frequencies which can be generated. A mechanical resonator which has been found to be very desirable in all respects is a magnetostrictive resonator element in the form of a rod made of a material known as Ni Span C, the rod being circularly magnetized by momentarily passing a direct current through the rod from end to end.

In another aspect, the invention teaches the use of a mechanical resonator comprising a metal rod provided at its extreme ends with piezo-electric elements, the elements being provided with electrical connections to the cathodes of the two electron control devices.

Other objects, advantages, features and aspects of the invention will be apparent to those skilled in the art from the following description taken together with the appended drawings wherein.

Figures 1, 2, 3, 4:
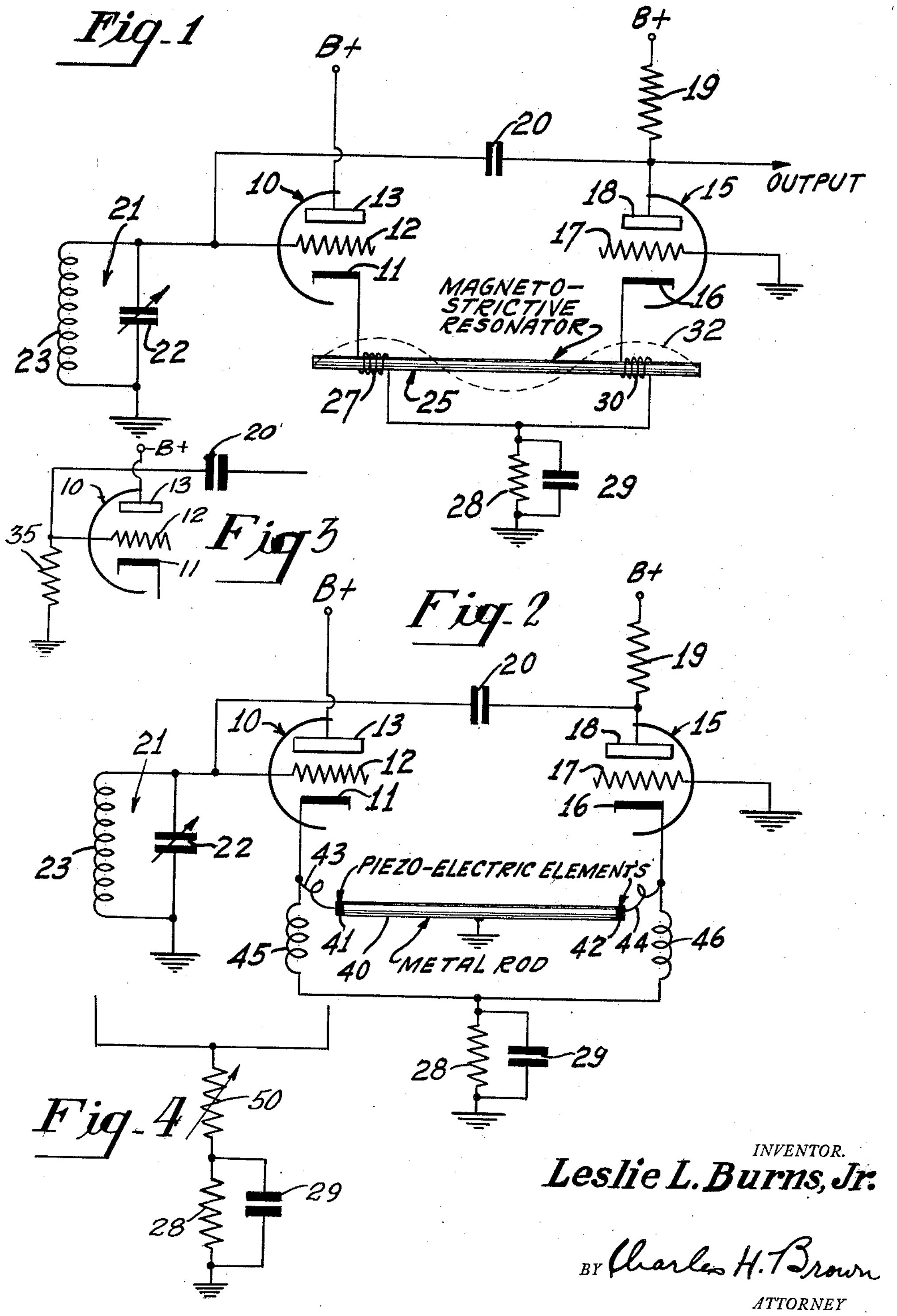
Fig. 1 is a circuit diagram of an oscillator constructed according to the teachings of this invention and including a pair of vacuum tubes with a magnetostrictive resonator coupling the cathodes of the tubes.
Fig. 2 is a circuit diagram of a mechanically stabilized oscillator wherein the mechanical resonator is in the form of a metal rod, one end of which is driven by a piezo-electric element, the other end being also provided with a piezo-electric element for take-off purposes.
Fig. 3 shows a circuit modification applicable to the mechanically stabilized oscillators of Figs. 1 and 2.
Fig. 4 shows another circuit modification applicable to the mechanically stabilized oscillators of Figs. 1 and 2.

Referring now to Fig. 1 for a detailed description of one embodiment of the invention, two triodes 10 and 15, which may be within a single evacuated envelope, include cathodes 11 and 16, grids 12 and 17 and anodes 13 and 18, respectively. A source of unidirectional B+ voltage is applied to the anode 13 of tube 10 and is applied through an anode resistor 19 to the anode 18 of tube 15. A coupling capacitor 20 is connected from anode 18 of tube 15 to grid 12 of tube 10. Grid 12 is also connected to one end of a tuned parallel circuit 21 including a variable capacitor 22 and inductor 23, the other end of the tuned circuit 21 being connected to ground. The grid 17 of tube 15 is connected to ground.

Cathode 11 of tube 10 is electromechanically coupled to a magnetostrictive resonator 25. Resonator 25 is preferably made of material such as nickel, nickel alloys having a low temperature-frequency coefficient, nickel plated aluminum, or nickel plated brass. By the use of such appropriate materials the magnetostrictive resonator may be provided with a permanent magnetic bias so that it is unnecessary to employ separate biasing magnets adjacent to the resonator element, although, if desired or necessary, permanent magnets may be used to provide magnetic bias for the rod 25 if it does not have sufficient residual magnetism. A material which is very good in all respects is known in the trade as Ni Span C, and it is a nickel-iron alloy including 42 per cent nickel, 5.5 per cent chromium, 2.5 per cent titanium, 0.06 per cent carbon, 0.4 per cent manganese, 0.5 per cent silicon and 0.4 per cent aluminum. The material used for magnetostrictive resonator 25 and its dimensions determine its natural frequency of mechanical oscillation. The length of resonator 25 should be such that there are multiples of half waves in the resonator at the desired frequency of oscillation. For example, in Ni Span C material, a half wavelength in the material is 2.4 centimeters long at a frequency of 100 kilocycles. If a resonator of three half wavelengths is to be employed, the resonator will then be 7.2 centimeters long. When the diameter of the resonator is small relative to its length, the value of the diameter has a negligible effect on the frequency of oscillation in the longitudinal mode. The resonator 25 conveniently may be one-eighth inch in diameter. If the resonator 25 is one operating in the torsion mode rather than the longitudinal mode, the length of the resonator for a given frequency of oscillation is about 60 per cent of that suitable for the longitudinal mode.

Cathode 11 of the tube 10 is coupled to resonator 25 by means of a driver coil 27, the other end of which is connected to ground through bias resistor 28 shunted by capacitor 29. Cathode 16 of tube 15 is coupled to resonator 25 by means of an output coil 30, the other end of which is also connected to ground through biasing means 28, 29. Other forms of biasing between the cathodes and grids of tubes 10 and 15 may be employed; if desired. In Fig. 1, magnetostrictive driver coil 27 is shown wound around resonator 25 in the same direction as output coil 30 is wound. The left-hand ends of coils 27 and 30 are connected to cathodes 11 and 16, respectively. It is assumed that the magnetic bias in the form of residual magnetism in resonator 25 has a direction which is the same in the vicinity of coil 27 as it is in the vicinity of coil 30. The length of resonator 25 is shown by the representation 32, indicating stress in the metal, to be an odd multiple of half waves in length. The strain or mechanical motion would be represented by a curve like 32 but displaced 90 degrees. It will be noted that coils 27 and 30 are positioned at points of maximum stress, as this is the most efficient location for the transfer of energy. If any one of the four above-mentioned conditions is reversed, the circuit will not oscillate or will oscillate at an undesired harmonically-related frequency; that is, if the magnetic bias is in different directions in the vicinities of coils 27 and 30, or if the coils 27 and 30 are an even multiple of half waves apart, or if the coils 27 and 30 are wound in opposite directions, or if the connections to one of the coils 27, 30 is reversed. The reversal of any two of the four conditions or of all of the conditions will result in oscillation in the same manner as results with the conditions shown in Fig. 1.

In operation, the frequency of oscillation is determined by resonator 25 and is substantially uneffected by tuned circuit 21. The tuned circuit 21 may be replaced by a simple resistor 35 as illustrated in Fig. 3. The feedback which is required in all oscillating circuits is here provided by the magnetostrictive resonator 25. For an explanation of the feedback, consider that tube 10 is drawing an increasing current at a given instant in time. Cathode 11 will then be going increasingly positive and the current through driver coil 27 will be increasing and causing the adjacent portion of resonator 25 to expand, for example. This expansion causes a contraction in the central portion of resonator 25 and an expansion in the portion of resonator 25 within output coil 30. This latter expansion induces the voltage in output coil 30 which tends to raise the potential of cathode 16 of tube 15. This reduces the current flowing through tube 15 and causes an increasingly positive potential to be applied from anode 18 through coupling capacitor 20 to the grid 12 of tube 10. Tube 10 which was drawing increasing amounts of current is thus made to draw a further increased current. From this, it is apparent that the circuit has a feedback of appropriate phase to compensate for losses in the circuit and maintain a condition of oscillation.

The circuit shown in Fig. 1 is represented as oscillating at a frequency such that there are three half waves in the magnetostrictive resonator 25. The circuit may be made to oscillate at some harmonically related frequencies by merely adjusting the frequency of tuned circuit 21. For maximum oscillation at other harmonically-related frequencies, it may also be necessary to adjust the positions of driver coil 27 and output coil 30 so that they are located at points of maximum stress in the resonator. These points will vary in position depending on the number of wavelengths in the resonator with different frequencies. As an example of the operation of a specific circuit having a magnetostrictive resonator with a fundamental frequency of seven kilocycles and having a tuned circuit 21 tunable over a limited range, the tuning of capacitor 22 resulted in oscillations jumping from frequencies of 70 to 84 to 98 kilocycles. It will be noted that these frequencies are even multiples of 7 kilocycles. By reversing the connections of one of coils 27, 30, oscillations were obtained at 77, 91 and 105 kilocycles, which are odd multiples of 7 kilocycles. Instead of reversing the connections of one of coils 27, 30, the same effect can be obtained by moving one of the coils a distance of about a half wave on resonator 25. Solely by way of example, inductor 23 may have a value of 0.06 henry, capacitor 22 may have values of 10–200 micro-microfarads, resistor 19 may have a value of 27,000 ohms, resistor 28 may have a value of 56 ohms and capacitor 29 may have a value of 25 microfarads.

Tuned circuit 21 improves the coupling from tube 15 to tube 10 by reason of its presenting a large impedance when tuned to the frequency of oscillation determined by resonator 25. While tuned circuit 21 is operative to select a harmonically related frequency of resonator 25, it does not have any significant effect on the exact frequency of oscillation of the oscillator and it may be omitted from the circuit and replaced by a high value resistor 35 as shown in Fig. 3. In this event, the positions of coils 27 and 30 must be more carefully adjusted to select the particular harmonically related frequency desired.

Fig. 2 shows a similar mechanically stabilized oscillator in which like parts bear the same numerals as those used in Fig. 1, the difference between the two circuits being that a piezo-electric mechanical resonator is employed in place of a magnetostrictive resonator. A metal rod 40 is cut to a length appropriate to the frequency and harmonics which it is desired to generate. Rod 40 need not be provided with magnetic bias. A piezo-electric driver element 41 is positioned at one end of rod 40 and a similar element 42 is positioned at the opposite end of rod 40. Piezo-electric elements 41 and 42 may, for example, be quartz, Rochelle salt or barium titanate. The elements may be in the form of discs silvered on both sides and soldered to metal rod 40. Fine wires 43 and 44 are connected from the exposed silvered sides of elements 41 and 42 to the cathodes 11 and 16, respectively, of the tubes. Metal rod 40 is connected, preferably at a motional node, to ground. The dimensions of piezo-electric elements 41 and 42 may be any convenient value since the length of metal rod 40 principally determines the frequency of oscillation of the oscillator circuit. However, optimum performance is obtained when the elements are a half wave or less in thickness. The elements may be, for example, between 1/32 and 1/8 of an inch thick for frequencies in the order of 100 kilocycles. The cathodes 11 and 16 are connected through radio frequency choke coils 45 and 46 and through a common bias circuit 47, 48 to ground. The circuit modification illustrated in Fig. 3 may also be applied to the oscillator of Fig. 2.

The operation of circuit shown in Fig. 2 is similar to that previously described in connection with Fig. 1, the primary difference being that the metal rod 40 is driven by a piezo-electric element at one end and an output is derived from the other end of rod 40 by means of an output piezo-electric element. The length of metal rod 40, including the effect of the piezo-electric elements mounted thereon determines the frequency of oscillation of the oscillator. Here again, tuned circuit 21 may be replaced by a resistor. Very high frequencies of oscillation can be obtained with the circuit of Fig. 2 because the piezo-electric elements 41 and 42 may be made very thin to provide for very high frequency of oscillation in rod 40.

If desired, a circuit may be constructed with a piezo-electric transducer at one end of a resonator and a magnetostrictive transducer at the opposite end both being electro-mechanical transducers.

In Figs. 1 and 2, a resistor or a rheostat 50 may be inserted in series between resistor 28 and the common point between coils 27 and 30, or coils 45 and 46, after the manner shown in Fig. 4. This improves the coupling between the two tubes so that the circuit will oscillate with a poor magnetostrictive resonator 25 or a poor piezo-electric resonator.

While frequencies of oscillation between 7 and 105 kilocycles have been mentioned herein by way of example, it will be understood that, by properly proportioning the mechanical resonator and other circuit elements, as low a frequency as may be desired can be obtained, and without much difficulty frequencies as high as a megacycle may be had with the circuit of Fig. 1, and as high as 5 megacycles may be had with the circuit of Fig. 2.

Among the advantages of the invention are: (1) Operation at any of several harmonically-related frequices are obtainable with a single control; for example, capacitor 22, (2) a variable sensitivity adjustment is possible so that poor magnetostrictive rods can be used as oscillator control elements, (3) no shielding is required since the impedances are low and the mutual impedance can be made bucking, and (4) when the circuit is properly adjusted oscillations occur only at frequencies controlled by the mechanical resonator.

What is claimed is:

1. A mechanically stabilized oscillator comprising, first and second electron discharge devices each having first, second, and third electrodes, means to apply direct current bias voltages to said electrodes, a capacitor coupling the third electrode of said second device to the second electrode of said first device, a mechanical resonator, first and second electro-mechanical transducers operatively disposed at points on said resonator which are separated by a multiple of substantially a half wavelength therein at the frequency of oscillation of said oscillator, and means providing individual current paths from said first electrodes of said devices to said respective transducers.

2. A mechanically stabilized oscillator comprising, first and second electron discharge devices each having cathode, grid and anode electrodes, means to apply direct current bias voltages to said electrodes, a capacitor coupling the anode of said second device to the grid of said first device, a mechanical resonator, first and second electro-mechanical transducers operatively disposed at points on said resonator which are separated by a multiple of substantially a half wavelength therein at the frequency of oscillation of said oscillator, and means providing a current path from the cathode of said first device to said first transducer, and means providing a current path from the cathode of said second device to said second transducer.

3. A mechanically stabilized oscillator comprising, first and second electron discharge devices each having first, second and third electrodes, means to apply direct current bias voltages to said electrodes, a capacitor coupling the third electrode of said second device to the second electrode of said first device, a magnetostrictive mechanical resonator, first and second coils operatively disposed at points on said resonator which are separated by a multiple of substantially a half wave-length therein at the frequency of oscillation of said oscillator and in energy transfer relation with said resonator, and means providing a current path from said first electrode of said first device to said first coil, and means providing a current path from said first electrode of said second device to said second coil.

4. A mechanically stabilized oscillator comprising, first and second electron discharge devices each having cathode, grid and anode electrodes, means to apply direct current bias voltages to said electrodes, a capacitor coupling the anode of said second device to the grid of said first device, and magnetostrictive mechanical resonator, first and second coils operatively disposed at points on said resonator which are separated by a multiple of substantially a half wavelength therein at the frequency of oscillation of said oscillator and an energy transfer relation with said resonator, and means providing a current path from the cathode of said first device to said first coil, and means providing a current path from the cathode of said second device to said second coil.

5. A mechanically stabilized oscillator comprising first and second electron control devices each having cathode, grid and anode electrodes, a magnetostrictive resonator, a driver coil around said resonator connected between the cathode of said first device and a junction point, an output coil around said resonator connected between the cathode of said second device and said junction point, cathode bias means connected between said junction point and ground, a source of uni-directional potential having a positive terminal referenced to ground, means connecting said positive terminal to the anode of said first device, a load resistor connected between said positive terminal and the anode of said second device, a connection of low impedance to radio frequency energy from the grid of said second device to ground, and a capacitor coupled from the anode of said second device to the grid of said first device.

6. A mechanically stabilized oscillator as defined in claim 5, and in addition, an impedance connected from the grid of said first device to ground.

7. A mechanically stabilized oscillator comprising first and second electron discharge devices each having first, second, and third electrodes, means to apply direct current bias voltages to said electrodes, a capacitor coupling the third electrode of said second device to the second electrode of said first device, a mechanical resonator, first and second electro-mechanical piezoelectric transducers operatively disposed at points on said resonator which are separated by a multiple of substantially a half-wavelength therein at the frequency of oscillation of said oscillator, and means providing individual current paths from said first electrodes of said devices to said respective transducers.

8. A mechanically stabilized oscillator comprising, first and second electron discharge devices each having cathode, grid and anode electrodes, means to apply direct current bias voltages to said electrodes, a capacitor coupling the anode of said second device to the grid of said first device, a magneto-strictive mechanical resonator, first and second coils arranged in series and operatively disposed at points on said resonator which are separated by a multiple of substantially a half wavelength therein at the frequency of oscillation of said oscillator and in energy transfer relation with said resonator, and leads providing direct current paths from the cathodes of said first and second devices to said first and second coils respectively.

References Cited in the file of this patent

UNITED STATES PATENTS

| | | |
|---|---|---|
| 1,811,127 | Harrison | June 23, 1931 |
| 2,001,132 | Hansell | May 14, 1935 |
| 2,113,365 | Artzt | Apr. 5, 1938 |
| 2,396,224 | Artzt | Mar. 12, 1946 |
| 2,683,252 | Gordon | July 6, 1954 |
| 2,696,960 | Harrison | Nov. 30, 1954 |

OTHER REFERENCES

The Transistor, Bell Telephone Laboratories, Duality as a Guide in Transistor Circuit Design, pp. 127–164, April 1951. (Copy in Div. 70.)